United States Patent Office 3,156,089
Patented Nov. 10, 1964

3,156,089
HYDROGEN PEROXIDE DECOMPOSITION
Herman J. Baumgartner, Danville, and Richard M. Roberts, Berkeley, Calif., assignors to Shell Oil Company, a corporation of Delaware
No Drawing. Filed Sept. 24, 1959, Ser. No. 843,035
9 Claims. (Cl. 60—35.4)

This invention relates to methods for decomposing hydrogen peroxide into oxygen and steam. It deals with a new and more advantageous method for carrying out this decomposition in the presence of solid catalysts.

Certain rocket motors currently in use are designed to use concentrated hydrogen peroxide as a regenerative coolant for the combustion chamber after which it is catalytically decomposed and the resulting oxygen and steam are fed to a combustion zone for reaction with a fuel. The decomposition of the hydrogen peroxide is brought about by a fixed bed of catalyst. Silver catalysts are most usually employed because they are capable of causing a relatively high hydrogen peroxide decomposition rate compared with most other known heterogeneous decomposition catalysts for hydrogen peroxide.

An important object of the present invention is the provision of an improved method of operating rocket motors of the foregoing type. A special object is to improve the start-up characteristics of hydrogen peroxide in a silver catalyst type of decomposer. A more general object is to provide a method of improving low-temperature starting with a fixed catalyst bed whether the hydrogen peroxide is being decomposed to generate oxygen and steam for oxidant or other use, or for the safe and economical disposal of waste peroxide or for other purposes. Another object is the provision of new hydrogen peroxide compositions containing properly controlled amounts of peroxide decomposition promoter which make it especially effective for achieving the foregoing objectives. Still other objects and advantages of the invention will be apparent from the following more detailed description of the invention in some of its preferred modifications, to which, however, the invention is not intended to be limited.

In normal operation of a hydrogen peroxide decomposer of the solid silver catalyst bed type, four different reaction zones can be distinguished as the peroxide which is being decomposed flows through the bed. In the zone of initial contact of the hydrogen peroxide with the catalyst, the rate of peroxide decomposition is usually lowest, being dependent on the surface characteristics of the particular catalyst. The heat of hydrogen peroxide decomposition in this zone is transferred rapidly to the peroxide solution by convection so the catalyst surface temperature is only a few degrees above the bulk temperature of the solution. In this first reaction zone the catalyst temperature rises gradually in the direction of flow of the hydrogen peroxide and then increases abruptly at the boundary between the first zone and a second zone in which the catalyst surface temperature is very close to, or the same as, the boiling temperature of the hydrogen peroxide at the existing pressure. In this zone liquid hydrogen peroxide in contact with the catalyst prevents the latter from attaining a higher temperature. This second zone is thus one in which nucleate boiling of the peroxide takes place. The nucleate boiling zone changes into a third zone as the temperature of the peroxide solution continues to rise. This is a zone in which the bulk temperature of the peroxide is so high that liquid contact with the catalyst can no longer transfer all the heat evolved. Consequently, a vapor film forms around the catalyst and film-boiling takes place. The rate of peroxide decomposition decreases and the temperature of the catalyst surface increases considerably above the boiling point of the hydrogen peroxide. The temperature of the peroxide finally reaches that at which homogeneous decomposition of both liquid and vapor proceed rapidly in addition to the heterogeneous decomposition which takes place on the container surfaces as well as the catalyst. This is the fourth and final reaction zone in which the decomposition is completed.

The kinetics of the reaction in the first zone largely determine the starting characteristics of the hydrogen peroxide in a given rocket motor catalyst bed. The present invention is based upon the unexpected discovery that when the decomposition is carried out in the presence of a controlled small amount of a certain type of organic material, all of the reaction zones are shifted to lower bulk solution temperatures compared with similar operation in the absence of such organic material. Addition of this organic material is thus effective in increasing the hydrogen peroxide decomposition rate markedly in the first or low-temperature reaction zone of the solid catalyst bed as a result of the shifting of the nucleate boiling zone to the lower hydrogen peroxide bulk temperature of the first reaction zone. The control of the decomposition rate thus made possible is especially advantageous in improving low-temperature starting of rocket motors or other jet propulsion devices for instance. It has been known for some time that when the bulk temperature of the hydrogen peroxide is reduced to about 40° F. or lower, it becomes very difficult to obtain a satisfactory start with a practical catalytic decomposer. The method and compositions of the invention, however, make quicker and surer starting feasible, regardless of outside temperature conditions, for example. This is not only important at the time of initial rocket firing but also where the decomposer is being operated intermittently.

The special type of organic material which has this advantageous effect on hydrogen peroxide decomposition in the presence of solid silver and like decomposition catalysts, is that which is obtained as a residue in the manufacture of hydrogen peroxide from organic compounds. It is generally a mixture of variable composition, depending upon the particular organic compound or mixture of organic compounds from which the peroxide is derived. In all cases, however, these residues have reached an equilibrium condition with hydrogen peroxide during the course of the manufacturing process and may, in this sense, be considered as stable to hydrogen peroxide since substantial further reaction of the organic residue with the hydrogen peroxide does not take place under the conditions of ordinary storage and shipment. While the exact nature of the compounds present in these organic residues has not fully been elucidated, it has been established that at least one type of component present in organic peroxide material stable to hydrogen peroxide in the above-indicated sense. This material may be organic peroxides and/or hydroperoxides or the like. Peroxidic compounds from aldehydes and ketones are especially effective decomposition promoters of this kind.

There are a number of different processes for producing hydrogen peroxide from organic starting compounds which can be used as the source of the organic residues employed for promoting hydrogen peroxide decomposition according to the present invention. One widely used commercial process for producing hydrogen peroxide makes use of an alkyl anthraquinone which is successively oxidized and catalytically hydrogenated so that the starting compound is regenerated for reuse in the process after separation of the hydrogen peroxide formed. One such method of operation is described, for example, in U.S. Patent 2,158,525. Another commercial source of hydrogen peroxide from organic compounds is the process of U.S. Patent 2,871,104, in which the peroxide is made by oxidizing a secondary alcohol or mixture of alcohols and a ketone is obtained as by-product. Other organic starting materials which have been used in hydrogen peroxide manufacture and result in organic residues which can be employed for promoting the silver catalyzed decomposition of hydrogen peroxide in accordance with the invention, include primary alcohols which give aldehydes as by-products as described in U.S. 2,479,111; hydrocarbons as taught in U.S. 2,376,257 and hydrazobenzenes whose oxidation to produce $H_2O_2$ is described in Canadian Patent 539,369 for example.

The amount of organic residue produced in the manufacture of hydrogen peroxide from organic compounds is relatively small. Great pains are taken to eliminate such impurities as completely as possible from the hydrogen peroxide before it is sold or used. It will usually be obtained most conveniently as a bottom product from which hydrogen peroxide has been more or less completely distilled. In preparing the new compositions of the invention, such bottoms can be added in the required controlled amounts to the purified hydrogen peroxide from which it was derived or to hydrogen peroxide from another organic source or sources or to hydrogen peroxide made by inorganic methods, for instance, electrolytically produced hydrogen peroxide. Alternatively one can conduct the purification of hydrogen peroxide from an organic source so as to obtain directly hydrogen peroxide containing the required concentrations of this new type of decomposition promoter. As a general rule it is most convenient to incorporate the organic residue in the hydrogen peroxide before feeding the latter to the catalytic decomposer. However, one can also operate satisfactorily by feeding the hydrogen peroxide and decomposition-promoting organic residue in the required proportions to the decomposer simultaneously. Especially where the promoter is intended only for use during start-up because of the advantage in starting at low hydrogen peroxide temperatures, it may be desirable to add the organic residue to the decomposer separately from the hydrogen peroxide.

It is desirable to use about 50 to about 10,000 milligrams of organic residue as carbon from hydrogen peroxide production from organic material per liter of hydrogen peroxide being decomposed in carrying out the invention. Lesser amounts of these organic residues have much reduced effectiveness while amounts substantially greater than about 10,000 mg. per liter are usually undesirable because in 90% or more concentrated hydrogen peroxide an explosive hazard exists and because the extra heat of reaction may raise the temperature sufficiently to fuse a silver catalyst. As a rule amounts in the range of about 100 to about 750 milligrams per liter of hydrogen peroxide are most advantageous because they provide hydrogen peroxide with the most desirable low-temperature start-up characteristics. With hydrogen peroxide containing amounts of the described organic residues in this range, satisfactory start-up of silver catalyst type hydrogen peroxide decomposers can be achieved even at peroxide temperatures from 32° F. down to the freezing point of hydrogen peroxide. This is in marked contrast with the hydrogen peroxide essentially free from organic materials which has been previously used in rocket decomposers. Such pure hydrogen peroxide is not capable of consistent satisfactory start-up at 43° F. or lower temperatures which are frequently encountered in large-scale rocket operations.

The hydrogen peroxide generally used in the catalyst decomposers of rockets is about 90% aqueous hydrogen peroxide but the present invention is not limited to hydrogen peroxide of such concentration. Especially where the invention is in use for decomposition of hydrogen peroxide for other purposes or as a means of disposal of peroxide one can use the new decomposition promoters with hydrogen peroxide of other concentrations. The promoters are especially effective, for example, aqueous $H_2O_2$ of about 30 to 100% wt. strength.

Various forms of catalytic decomposers can be used with the hydrogen peroxide containing the decomposition promoters of the invention. Those employing a dispersion of silver decomposition catalyst in the hydrogen peroxide to be decomposed can be successfully used. It is usually more advantageous to use the catalyst in the form of a bed of solid catalyst through which the peroxide to be decomposed is passed. United States Patents 2,721,788 and 2,865,721, for example, describe suitable catalyst bed assemblies in which silver catalysts can be used according to the present process. Since the organic additives of the invention greatly increase the specific decomposition rate of the hydrogen peroxide, it is important that the decomposer be designed with this in mind. To take fullest advantage of the new compositions of the invention it is desirable to provide sufficient heat transfer in the silver catalyst bed so that the bulk temperature of the hydrogen peroxide in the third or film-boiling reaction zone reaches the adiabatic decomposition temperature and rapid, homogeneous decomposition in both liquid and vapor takes place in the final reaction zone. Complete conversion of the peroxide then takes place and there is no danger of interruption of operation by formation of a vapor barrier around the catalyst. At hydrogen peroxide bulk temperatures too low for the high-temperature decomposition reactions not dependent upon silver catalysis to take over and complete the decomposition, the reaction becomes too slow. It is then especially advantageous to operate the system at the highest pressure feasible under the circumstances. High pressure increases the rate of hydrogen peroxide decomposition in the nucleate and film-boiling zones. It thus promotes the start of the desired high-temperature decomposition reactions before the rate of reaction falls as a result of vapor barrier formation.

The following examples illustrate in more detail some of the ways in which the invention can be applied.

*Example I*

Comparative tests of decomposition of electrolytic 90% hydrogen peroxide with and without added organic residue from the manufacture of hydrogen peroxide by oxidizing isopropyl alcohol according to the method of Rust Patent—U.S. 2,871,104 were carried out. The organic residue was obtained by deionizing a stream of hydrogen peroxide derived from oxidation of isopropyl alcohol and concentrated in organic residue content. The deionization was carried out to remove inorganic contaminants which might poison the silver catalyst. The tests were carried out in a continuous decomposer in which the hydrogen peroxide was fed at the rate of 45 grams per minute upward into contact with a silver wire catalyst one-fourth inch long and one-eighth inch in diameter in a stainless steel tube of three-sixteenth inch inside diameter. From the following results of tests carried out with a pressure of 800 p.s.i.g. in the decomposer, it will be seen that the addition of 400 milligrams of the organic residue per liter of hydrogen peroxide almost doubled the rate of hydrogen peroxide decomposition as determined by measurement of the oxygen evolved:

| Organic Residue in the 90% Electrolytic $H_2O_2$ (mg. per liter) | Silver Catalyst Surface Area (sq. in.) | Initial Hydrogen Peroxide Solution Temperature (° C.) | Rate of Oxygen Evolution (liters per min. per sq. in. catalyst surface) |
|---|---|---|---|
| None | 0.1148 | 63 | 16.9 |
| 400 | 0.1193 | 60 | 26.8 |
| None | 0.1148 | 86 | 10.8 |
| 400 | 0.1176 | 85 | 27.2 |

*Example II*

Tests in a static system also show the advantage of organic residues similarly recovered from hydrogen peroxide manufacture from isopropanol in promoting the silver-catalyzed decomposition. The tests were made with 90% electrolytic hydrogen peroxide in a modified Dewar flask with stirring. The flask was charged with 100 ml. of the peroxide with and without 400 milligrams of the added promoter per liter of peroxide and silver wire of 0.014 inch diameter as catalyst. The much faster temperature rise obtained with the added promoter is shown by the following results of temperature measurements made at intervals during tests of 29-minute duration.

| Time after Start of Test (minutes) | Temperature of Peroxide | |
|---|---|---|
| | Without Promoter (° F.) | With Added Promoter (° F.) |
| 0 | 32 | 32 |
| 4 | 34 | 57 |
| 10 | 36 | 90 |
| 16 | 37 | 116 |
| 20 | 39 | 132 |
| 25 | 41 | 153 |
| 29 | 43 | 161 |

The striking difference in rate of oxygen evolution when carrying out the adiabatic decomposition with hydrogen peroxide containing the organic residue is shown by the following figures obtained by periodic measurement of the oxygen evolved. An added benefit under these conditions is the lower rate of catalyst loss obtained when using the additive.

| Hydrogen Peroxide used | Weight of Silver Catalyst per 100 ml. $H_2O_2$ (grams) | Oxygen Evolved (liters) after Decomposition Times (seconds) | | | | Catalyst Loss (wt. percent) |
|---|---|---|---|---|---|---|
| | | 500 | 1,000 | 1,500 | 2,000 | |
| No additive | 0.02696 | 0.052 | 0.19 | 0.25 | 0.32 | 45.4 |
| 400 mg. organic residue added per liter | 0.02644 | 1.6 | 3.0 | 4.15 | 5.1 | 22.0 |

*Example III*

A series of successful tests of decomposition of hydrogen peroxide of about 87 to 90% concentration, containing various amounts of organic residue from the manufacture of hydrogen peroxide by oxidation of secondary propyl alcohol was carried out in a decomposer designed by the Naval Air Rocket Test Station at Lake Denmark, New Jersey. The decomposer was provided with thermocouples for measuring temperature and SR–4 Baldwin transducers for pressure measurements before and after the ⅝-inch diameter catalyst bed of silver catalyst screens alternated with stainless steel support screens in a stainless steel cartridge. The following are the results of tests when using plugs taken from full-scale motor catalyst beds supplied by Reaction Motors, Inc.

and the feed control valve was opened and the hydrogen peroxide allowed to flow through the feed lines to a dump valve just ahead of the decomposer so that lines were cooled to the hydrogen peroxide temperature, after which the dump valve was closed and the silver catalyst bed was quickly flooded with the cold peroxide and the flow rate then reduced until operation became satisfactory for at least one minute. The decomposer was allowed 15 seconds to start. If it did not start in that time, the test is reported as "no start" in the following table of results:

| Amount of Organic Residue Added (mg. per liter) | Feed Temperature (° F.) | Catalyst Bed Loading (lbs. $H_2O_2$ per sq. in. per min.) | Initial Catalyst Bed Temperature (° F.) | Start |
|---|---|---|---|---|
| None | 18.5 | 17.7 | Ambient | No start. |
| Do | 26.7 | 18.9 | do | Do. |
| Do | 33.5 | 18.9 | do | Do. |
| Do | 22.8 | 33.3 | 22.8 | Do. |
| Do | 29.0 | 37.8 | 29.0 | Do. |
| Do | 44.2 | 34.6 | 44.2 | Do. |
| Do | 44.2 | 27.5 | 44.2 | Satisfactory. |
| 400 | 17.5 | 49.1 | Ambient [1] | Do. |
| 400 | 26.4 | 36.4 | do [1] | Do. |

[1] Bed could not be flooded at the flow rate used.

The following table shows how increasing amounts of this organic residue make possible satisfactory start-up of silver-catalyzed decomposition of hydrogen peroxide at lower temperatures:

| Amount of Promoter (mg. per liter) | Temperature of Satisfactory Start-up (° F.) |
|---|---|
| None | 44 |
| 50 | 37 |
| 100 | 31 |
| 200 | 18 |
| 300 | 5 |
| 400 | −10 |

In the foregoing discussion the promoters have been described in terms of their method of manufacture as by-products of the production of hydrogen peroxide from organic materials. This is an especially advantageous source of cheap and readily available promoters which are highly effective in the silver-catalyzed decomposition of hydrogen peroxide but the invention is not limited thereto since the same general type of organic peroxy promoting material can be obtained in other ways. It may, for instance, be especially synthesized for use in the invention by reacting organic compounds with hydrogen peroxide. Suitable organic starting materials for such syntheses are, for example, those encountered in making hydrogen peroxide according to the methods pre-

| Amount of Promoter (mg. per liter) | Inlet Temperature (° F.) | Flow Rate (lbs. $H_2O_2$ per sq. in. per min.) | Outlet Temperature (° F.) | Chamber Pressure (p.s.i.g.) | Max. Pressure Drop across Catalyst Bed (p.s.i.) | Outlet Velocity (ft. per sec.) | Length of Test (min.) |
|---|---|---|---|---|---|---|---|
| 56 | 78 | 26.5 | 1,359 | 640 | 52 | 3,090 | 52 |
| 250 [1] | 71.6 | 21.5 | 1,310 | 500 | 83 | 3,000 | 67 |
| 430 | 78.8 | 25.8 | 1,295 | 605 | 91 | 3,000 | 32 |

[1] $H_2O_2$ also contained 4.0 mg. per liter of tin as sodium stannate.

*Example IV*

The effect on decomposer start-up at low temperatures of adding to the 90% electrolytic hydrogen peroxide organic residue from hydrogen peroxide production by the method of U.S. 2,871,104 was determined in the apparatus of Example III by cooling the $H_2O_2$ by immersing the feed tank in a mixture of ice, calcium chloride, water and solid carbon dioxide. After the hydrogen peroxide had been cooled, the tank was pressured with nitrogen viously discussed. They may be either the starting organic compound or intermediates or organic products or by-products of these or other methods of hydrogen peroxide production from organic material. Thus alcohols, ketones, monocarboxylic acids, aldehydes, anthraquinones, hydrazobenzenes, gaseous or liquid hydrocarbons and the like or mixtures thereof can be oxidized to peroxidic materials with hydrogen peroxide or other oxidizing agents to make the organic residues which are the promoters of decomposition according to the present invention and are included in the definition of these promoters which is used in the accompanying claims whether or not there is any concomitant production of hydrogen peroxide therewith. Still other variations can be made in the invention which will, therefore, be recognized as not limited to the examples of its application which have been given by way of illustration only, nor by any theory proposed in explanation of the improved results which are obtained.

We claim as our invention:

1. A method for decomposing hydrogen peroxide of about 30 to 100% wt. concentration which comprises contacting the hydrogen peroxide with a solid silver-containing decomposition catalyst in the presence of between about 50 and about 10,000 milligrams per liter of organic peroxide-containing residue from hydrogen peroxide production by oxidizing a compound selected from the group consisting of alkyl anthraquinones, alcohols, hydrocarbons and hydrazobenzenes.

2. A process in accordance with claim 1 wherein the said organic residue is produced in the course of manufacture of hydrogen peroxide from an alcohol.

3. A process in accordance with claim 2 wherein the organic residue is produced in the manufacture of $H_2O_2$ from a secondary alcohol.

4. A process in accordance with claim 1 wherein the said organic residue is produced in the course of manufacture of hydrogen peroxide by successive oxidation of an alkyl anthraquinone and hydrogenation of the oxidation product.

5. A process in accordance with claim 1 wherein the said organic residue is present in an amount between about 100 and about 750 milligrams per liter of the hydrogen peroxide.

6. An oxidant adapted for use in liquid fuel rocket motors in which hydrogen peroxide is catalytically decomposed in a bed of solid silver catalyst, consisting essentially of hydrogen peroxide of about 90 to 100% wt. concentration containing about 50 to about 750 milligrams per liter of organic peroxide-containing residue from hydrogen peroxide production by oxidizing a compound selected from the group consisting of alkyl anthraquinones, alcohols, hydrocarbons and hydrazobenzenes.

7. An oxidant in accordance with claim 6 wherein the hydrogen peroxide has a concentration of about 90% weight and contains about 100 to about 750 milligrams per liter of an organic peroxide-containing residue produced in manufacture of hydrogen peroxide by oxidizing a secondary alcohol having 3 to 5 carbon atoms per molecule.

8. Hydrogen peroxide of about 30 to 100% wt. concentration having a high rate of decomposition at low temperatures consisting essentially of electrolytic hydrogen peroxide to which has been added about 50 to about 10,000 milligrams per liter of organic peroxide-containing residue from hydrogen peroxide production from a compound selected from the group consisting of alkyl anthraquinones, alcohols, hydrocarbons and hydrazobenzenes.

9. Hydrogen peroxide consisting essentially of electrolytic hydrogen peroxide of about 90% concentration containing about 100 to about 750 milligrams per liter of organic peroxide-containing residue produced in the manufacture of hydrogen peroxide by oxidizing a secondary alcohol having 3 to 5 carbon atoms per molecule.

References Cited in the file of this patent

UNITED STATES PATENTS

| | | |
|---|---|---|
| 2,749,291 | Pierotti et al. | June 5, 1956 |
| 2,791,883 | Moore et al. | May 14, 1957 |